Figure 1:
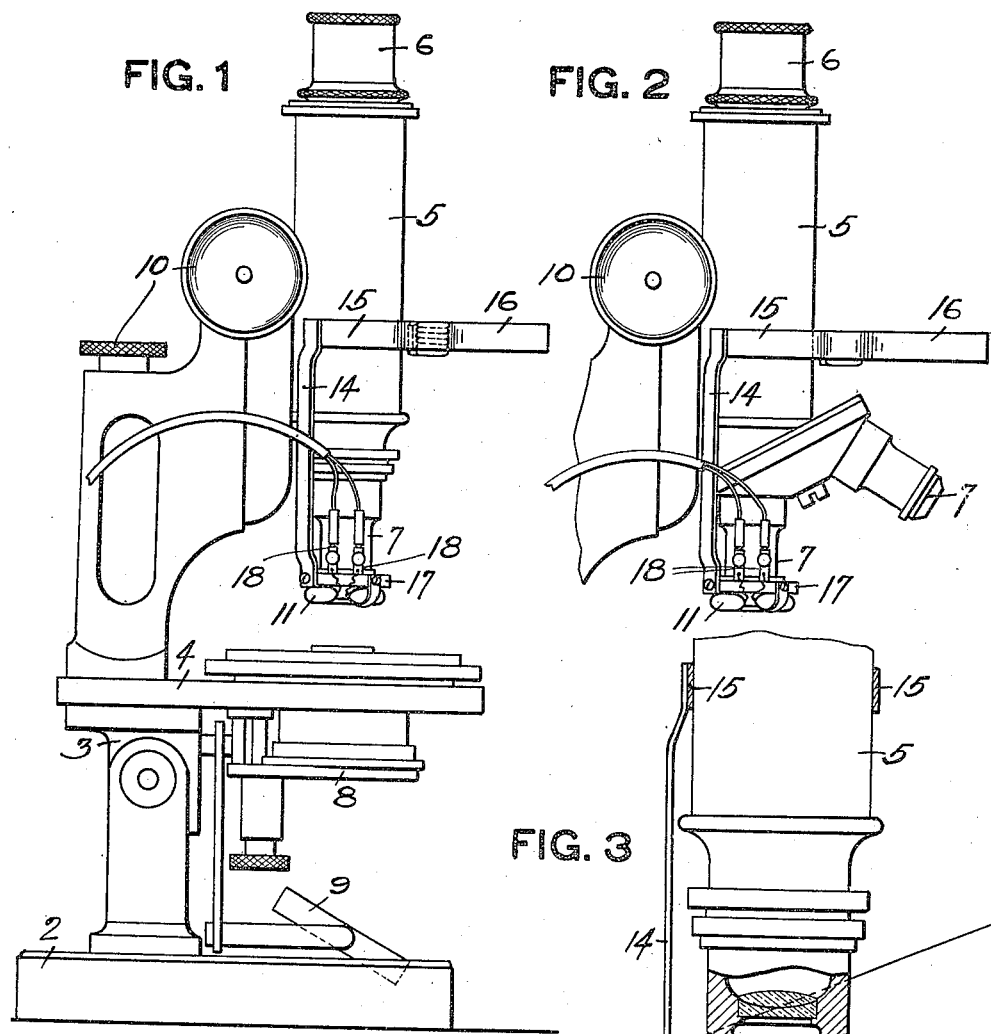

A. SILVERMAN.
ILLUMINATOR FOR MICROSCOPES.
APPLICATION FILED SEPT. 12, 1917.

1,311,186.

Patented July 29, 1919.

INVENTOR
Alexander Silverman
by Kay Totten & Powell attys

UNITED STATES PATENT OFFICE.

ALEXANDER SILVERMAN, OF PITTSBURGH, PENNSYLVANIA.

ILLUMINATOR FOR MICROSCOPES.

1,311,186. Specification of Letters Patent. Patented July 29, 1919.

Application filed September 12, 1917. Serial No. 190,905.

*To all whom it may concern:*

Be it known that I, ALEXANDER SILVERMAN, a citizen of the United States, and resident of Pittsburgh, in the county of Allegheny and State of Pennsylvania, have invented a new and useful Improvement in Illuminators for Microscopes; and I do hereby declare the following to be a full, clear, and exact description thereof.

My invention relates to magnifying instruments, microscopes and the like, and has particular reference to means for illuminating the field of the objective of these instruments.

This application illustrates a further development of the device presented in my copending application, Serial No. 149,501, filed February 19, 1917. It also illustrates a further development of the invention set forth and claimed in Letters Patent of the United States #1,267,287, granted to me May 21st 1918.

The invention is devised primarily to provide artificial illumination for the field, or the object, and has special advantages when by reason of the nature or location of the field, or of the object, natural or other lighting of the field's zone as now employed is not available for efficient illumination, or requires adjustment or changes of the position of the microscope.

The invention also aims to provide means for amplifying the available light, if said light is insufficient. Insufficient light and light precluded from the field include instances when the field or the object to be observed is in a recess, the walls of which shroud the same in such manner as to cause the light to be insufficient for clear observation. For example, when the object, either transparent or opaque, must be supported on or contained in opaque supports or vessels which prevent or preclude the light, or deflect the light rays to prevent sufficient illumination.

Further objects are,—to include means for concentrating the light directly on the object to be examined; and distributing the light uniformly along the best lines for observation; protecting the eye of the observer from the light and adjusting the light with respect to the focal position of the objective lens, as that lens is adjusted.

The adjustment of the light relative to the objective of a microscope is of singular importance in this connection since the minute observations necessary require that the most perfect illumination,—both as to distance from the material observed and the diffusion of the light over said material—is of the utmost importance in order to make not only accurate observation, but also to make photographic images through the microscope.

A still further object is to so arrange the supporting means for the lighting device that said supporting means will not in any way obstruct or be in the way of any laterally-projecting objective of the microscope when the lighting device is mounted adjacent the axial objective.

Figure 2:
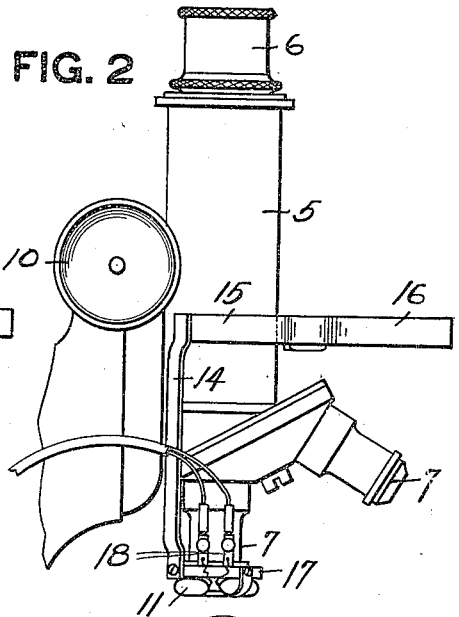
Figure 3:
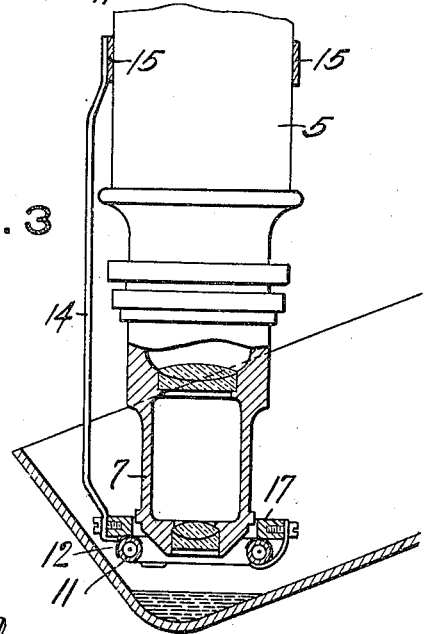
Figure 4:
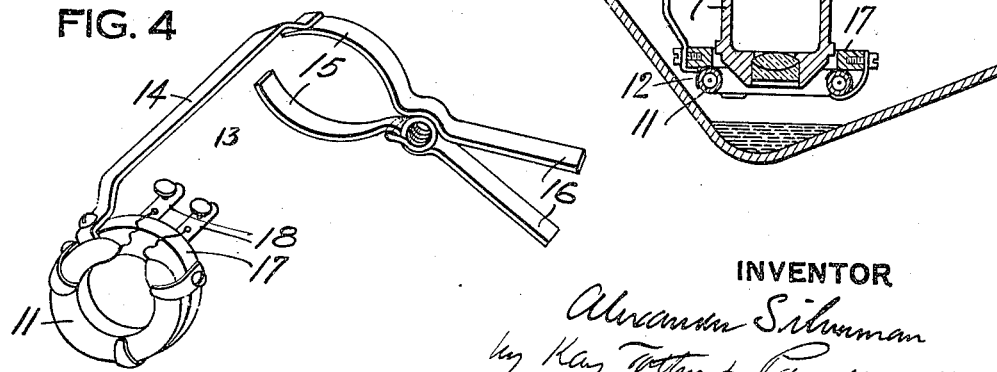

In the accompanying drawings, Figure 1 is a side elevation of a microscope with my invention applied thereto; Fig. 2 is a similar view of an instrument having a plurality of objectives and showing the invention arranged for use with such class of instruments; Fig. 3 is an enlarged vertical section of the objective of an instrument and my light invention as employed for use in making observations in vessels which precludes efficient light from other sources; and Fig. 4 is a perspective view of the device detached from the instrument.

The invention as illustrated in Fig. 1 is shown as applied to a microscope comprising a base and pillar 2, supporting an inclination joint 3, and the stage 4. The stage carries the body-tube 5 with its draw-tube and eye-piece 6, and has the objective 7. The sub-base for supporting the condenser lens and diaphragm is indicated at 8, and the light-projecting mirror for illuminating the object from below is shown at 9. The body-tube is arranged for focusing by suitable rack and pinion, (not shown) and is operated by the hand-wheels 10. All of the above structure is usual with instruments of this class and forms no part of the present invention—and the instrument is shown only as one example of a microscope for which the invention is adapted.

The means for artificially illuminating the field of the objective, and the object itself, consists in an illuminator or light, preferably an electric lamp, adapted to surround and lie close to the objective lens, and to directly illuminate the field within the view of the lens while providing for the protection of the person using the microscope from the light rays, the light moving with the lens as it is adjusted, so that while the eye of the observer is protected, the work to be observed is always directly illuminated. The lamp is indicated at 11, and may be any suitable electric or other lamp, or a series of lights arranged to lie concentric with the lens. I prefer to employ a small single light of circular form, as shown, for the reason that such form of lamp may be conveniently arranged for the purpose.

The lamp thus consists of a small tube containing the light source and bent in a circle, so that it surrounds the nose of the objective. While the lamp may thus be entirely protected from the eye of the observer, I also prefer that the upper part of the tube or lamp be enameled or so coated as to form a reflector, as at 12, thus intensifying the light upon the field or object to be observed. The light is carried upon a holder 13 adapted to support the light, which is made so as to be readily detachable and be adjustable on the instrument.

The holder comprises an arm 14, which at its upper end is attached to the outer or free end of one of the clamping fingers 15 of a spring-clamp. Said clamping fingers are provided with finger-arms 16 by which the spring-clamp may be manipulated in adjusting the holder in position on the body-tube 5. The clamps, preferably, are fashioned to grasp the body-tube of the instrument as such body-tube is generally concentric with the lens-barrel and movable therewith when the objective is adjusted, and it thus affords convenient means for quickly connecting the light to the microscope in proper position for use.

To the lower end of the arm 14 is secured a ringlike member 17, which holds the illuminator or light 11 concentrically around the base of the objective in close relation thereto so that the light is projected downwardly upon the field.

Suitable contact posts 18 or other connections are secured to the ring to connect the lamp to the source of light.

It will thus be seen from the above description of the device and its application that it may be readily applied to any character of magnifying instrument to which it is applicable, and that it provides means for illuminating the objects to be examined, giving the advantage, for instance, in all microscopes of direct illumination of the field from a source concentric with the objective, and also providing means for illumination of opaque objects, the objects to be examined in locations which prohibit the employment of the usual illumination.

For example, as shown in Fig. 3, the invention is shown in use in connection with an opaque bowl or any contents thereof. Here it has the advantage of high illumination of the object, whether a solid body or supported in liquid, or even the liquid itself. The device is of particular advantage to bacteriologists, metallographers, and in the chemical industries and in other arts for examining substances contained in deep vessels or the vessels themselves, which because of the shape of the container or of the vessel, prevent the use of other lighting means.

It will be particularly noted, however, that the construction and arrangement of the support is of peculiar advantage for microscopes of the type shown, generally, but particularly, for those of the older type having the laterally-projecting nose 7; for, as shown in Figs. 1 and 2 especially, the supporting-arm 14, which is attached to the free outer end of one of the spring-clamp fingers 15, is located entirely free of the nose or objective 7 and its support, and does not interfere in any way with the operation of the microscope. Furthermore, said support 14 lies along what might be termed the "dead-line," or junction between the microscope tube and its adjusting rack.

The adjustability of my illuminator is an especially important feature in the examination of objects under the microscope, and in micro-photography. Thus, by raising or lowering the illuminator, the intensity of the illumination in the field illuminated varies. Hence, the most advantageous arrangement of the light is secured for examination of granular or crystalline substances, and for making photographs thereof.

While I have described a particular embodiment of the invention, it is to be understood that the invention is not so limited, but may be varied at will within the scope of the appended claims.

What I claim is:

1. An illuminator for microscopes and the like, comprising a removable support, attaching means on said support for attaching same to the microscope, a lamp adapted to lie adjacent to and substantially surround the objective of the microscope, an arm on said support between said attaching means and said lamp adapted to lie adjacent the junction between the objective-tube and the supporting means for said tube.

2. An illuminator for microscopes and the like, comprising a removable spring-clamp adapted to be attached to the objective support, a lamp arranged to lie adjacent the objective, and a supporting-arm attached to said lamp and to one of the free ends of said clamp.

3. An illuminator for a microscope and the like, comprising a detachable supporting clamp adapted to grasp the objective-tube, a lamp arranged adjacent to the objective, and a supporting-arm connecting said lamp with said clamp and arranged to extend along the line of junction between the objective-tube and its supporting adjusting rack.

4. An illuminator for a microscope and the like, comprising a detachable supporting clamp adapted to grasp the objective-tube, a lamp arranged adjacent to the objective, and a supporting-arm connecting said lamp with said clamp and arranged to extend along the line of junction between the objective-tube and its support.

5. An illuminator for microscopes and the like, comprising a supporting clamp adapted to be attached to the objective-tube, a lamp arranged to lie adjacent to the objective, and a connecting supporting-arm attached to one end of said lamp and at the other end to said clamp in a position to be free of the laterally-extending nose of said objective-tube.

In testimony whereof, I, the said ALEXANDER SILVERMAN, have hereunto set my hand.

ALEXANDER SILVERMAN.

Witnesses:
J. R. KELLER,
IRENE F. GEYER.

Copies of this patent may be obtained for five cents each, by addressing the "Commissioner of Patents, Washington, D. C."